(12) United States Patent
Korshikov et al.

(10) Patent No.: US 11,718,690 B2
(45) Date of Patent: Aug. 8, 2023

(54) 3D PRINTED MATERIAL, STRUCTURE AND METHOD FOR MAKING THE SAME

(71) Applicant: Mighty Buildings, Inc., San Francisco, CA (US)

(72) Inventors: Vasily Korshikov, Tomsk (RU); Anna Trushina, Tomsk (RU); Dmitry Starodubtsev, Tomsk (RU); Slava Solonitsyn, Singapore (SG); Igor Kovalev, Tomsk (RU); Aleksei Dubov, San Mateo, CA (US)

(73) Assignee: Mighty Buildings, Inc., Oakland, CA (US)

( * ) Notice: Subject to any disclaimer, the term of this patent is extended or adjusted under 35 U.S.C. 154(b) by 0 days.

(21) Appl. No.: 17/482,687

(22) Filed: Sep. 23, 2021

(65) Prior Publication Data

US 2022/0002451 A1    Jan. 6, 2022

Related U.S. Application Data

(62) Division of application No. 16/276,521, filed on Feb. 14, 2019, now Pat. No. 11,267,913.

(Continued)

(51) Int. Cl.
*C08F 22/20* (2006.01)
*C08K 3/38* (2006.01)
(Continued)

(52) U.S. Cl.
CPC ............. *C08F 22/20* (2013.01); *B29B 7/10* (2013.01); *B29B 7/244* (2013.01); *B29B 7/421* (2013.01);
(Continued)

(58) Field of Classification Search
CPC ........ C08F 22/20; C08F 222/102; B29B 7/10; B29B 7/244; B29B 7/421; B29B 7/748;
(Continued)

(56) References Cited

U.S. PATENT DOCUMENTS

| 4,565,769 A | 1/1986 | Dueber et al. |
| 4,591,522 A | 5/1986 | Kang et al. |

(Continued)

FOREIGN PATENT DOCUMENTS

| CN | 105733271 A | 7/2016 |
| DE | 102015007004 A1 | 5/2016 |

(Continued)

*Primary Examiner* — Jessica M Roswell
(74) *Attorney, Agent, or Firm* — Cognition IP, P.C.; Edward Steakley; Justin White (57) ABSTRACT

A formulation for a photopolymer composite material for a 3D printing system includes an acrylate oligomer, an inorganic hydrate, a reinforcing filler, and an ultraviolet (UV) initiator. In the formulation the acrylate oligomer may be found in the range between about 20.0-60.0 w % of the formulation. The inorganic hydrate may be found in the range between about 20.0-50.0 w % of the formulation. The reinforcing filler may be found in the range between about 5.0-60.0 w % of the formulation, and the UV initiator may be found in the range between about 0.001-0.5 w % of the formulation. A method of generating a formulation of a photopolymer composite material for use in a 3D printing system includes using an acrylate oligomer, an inorganic hydrate, a reinforcing filler, and an ultraviolet (UV) initiator.

20 Claims, 6 Drawing Sheets

Related U.S. Application Data (60) Provisional application No. 62/630,725, filed on Feb. 14, 2018.

(51) Int. Cl.

| | | |
|---|---|---|
| *B29B 7/42* | (2006.01) |
| *B29B 7/74* | (2006.01) |
| *B29B 7/90* | (2006.01) |
| *C08K 3/22* | (2006.01) |
| *B33Y 70/00* | (2020.01) |
| *C08K 3/013* | (2018.01) |
| *C08K 5/5397* | (2006.01) |
| *B29C 64/00* | (2017.01) |
| *B29B 7/24* | (2006.01) |
| *B29B 7/10* | (2006.01) |
| *B33Y 40/10* | (2020.01) |
| *B33Y 70/10* | (2020.01) |
| *B29B 7/26* | (2006.01) |
| *B33Y 30/00* | (2015.01) |
| *B29B 7/28* | (2006.01) |

(52) U.S. Cl.
CPC .............. *B29B 7/748* (2013.01); *B29B 7/749* (2013.01); *B29B 7/7485* (2013.01); *B29B 7/90* (2013.01); *B29C 64/00* (2017.08); *B33Y 40/10* (2020.01); *B33Y 70/10* (2020.01); *C08K 3/013* (2018.01); *C08K 3/22* (2013.01); *C08K 3/38* (2013.01); *C08K 5/5397* (2013.01); *B29B 7/26* (2013.01); *B29B 7/28* (2013.01); *B33Y 30/00* (2014.12); *C08K 2003/2227* (2013.01); *C08K 2003/387* (2013.01)

(58) Field of Classification Search
CPC ......... B29B 7/7485; B29B 7/749; B29B 7/90; B29B 7/26; B29B 7/28; B29C 64/00; B29C 64/106; B33Y 40/10; B33Y 70/10; B33Y 30/00; B33Y 10/00; C08K 3/013; C08K 3/22; C08K 2003/2227; C08K 3/38; C08K 5/5397; C08K 2003/387
See application file for complete search history.

(56) References Cited

U.S. PATENT DOCUMENTS

| | | |
|---|---|---|
| 4,994,518 A | 2/1991 | Morin et al. |
| 5,183,833 A | 2/1993 | Fisher et al. |
| 5,322,861 A | 6/1994 | Tsuge et al. |
| 6,103,779 A | 8/2000 | Guzauskas |
| 6,350,792 B1 | 2/2002 | Smetana et al. |
| 7,195,857 B2 | 3/2007 | Tamura et al. |
| 8,092,858 B2 | 1/2012 | Smith |
| 9,868,871 B2 | 1/2018 | Liu et al. |
| 9,944,804 B1 | 4/2018 | Liu et al. |
| 9,944,805 B1 | 4/2018 | Liu et al. |
| 2002/0088584 A1 | 7/2002 | Merkley et al. |
| 2003/0215901 A1 | 11/2003 | Khanuja et al. |
| 2004/0192804 A1 | 9/2004 | Hisatoshi et al. |
| 2005/0239916 A1 | 10/2005 | Day et al. |
| 2008/0255264 A1 | 10/2008 | Hong et al. |
| 2010/0069469 A1 | 3/2010 | Young et al. |
| 2010/0327493 A1* | 12/2010 | Fong ................. B33Y 10/00 264/401 |
| 2011/0311906 A1 | 12/2011 | Rolle et al. |

FOREIGN PATENT DOCUMENTS

| | | |
|---|---|---|
| EP | 1330421 A2 | 7/2003 |
| EP | 2207838 A1 | 7/2010 |
| EP | 3103638 A1 | 12/2016 |
| EP | 1330420 B1 | 1/2017 |
| JP | 510672 | 4/2002 |
| KR | 20180053777 A | 5/2018 |
| WO | 0228796 A2 | 4/2002 |

* cited by examiner

3D PRINTED MATERIAL, STRUCTURE AND METHOD FOR MAKING THE SAME

CROSS-REFERENCE TO RELATED APPLICATIONS

This application is a divisional of U.S. application Ser. No. 16/276,521 filed Feb. 14, 2019, which claims the benefit of U.S. Provisional Application Ser. No. 62/630,725, filed Feb. 14, 2018, the entire content of which is incorporated by reference herein.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the 3D printed articles were generally models, the industry is quickly advancing by creating 3D printed articles that may be functional parts in more complex systems, such as hinges, tools, structural elements.

In existing 3D printing processes, a 3D object is created by forming layers of material under computer control without molding. For example, 3D information of a structure is determined using computer 3D modeling fragmentation and a prepared mixture can be fed from a nozzle by mechanical control to print the structure.

One serious problem and challenge of 3D printing is that printing materials meeting requirements of certain applications can be very scarce. For example, existing printing materials are mainly organic materials. The organic materials are printed in a molten state at a high temperature via layer by layer deposition. Curing of the organic materials is prone to oxidation decomposition, and the preparation and printing processes may emit unpleasant toxic gases that harm the environment and human health. In addition, the organic materials may be printed under demanding conditions which incur high costs. Structures printed with the organic materials may have poor mechanical properties and are therefore not suitable for certain applications such as constructing livable buildings, thus limiting the application of 3D printing technology to a certain extent.

Another example of printing material is cement-based materials such as concrete. Cement-based materials generally take a long time to solidify. Thus, such materials generally cannot meet performance requirements requiring the material to rapidly solidify in a short period of time. Even though the speed of solidification can be increased by changing the formulation, such increase is usually limited or difficult to control and makes 3D printing impractical for certain circumstances such as constructing a building on a construction site.

In view of the foregoing, there is a need for improvements and/or alternative or additional solutions to improve 3D printing materials and processes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A photopolymer composite material construction material combines properties of a polymer matrix and microcrystalline inorganic fillers, which have a monolithic amorphous structure with low porosity. The material comprises a base photopolymer, ensuring layers chemically adhere to each other during the printing process. With the layer-by-layer deposition of the material in the 3D printing process, each new curable layer is firmly fixed to the previous one due to the chemical adhesion between liquid and cured polymer matrix. During experimentation, the photopolymer composite material forms a solid monolithic structure with layer-by-layer curing. Polymer and inorganic parts of the compound act synergistically, the polymer matrix provides high compressive strength, as well as coats the filler particles, protecting them against aggressive environmental exposures (moisture, acids, alkali, etc.). Further, the presence of the inorganic components decreases the plasticity of the photopolymer composite, resulting in higher tensile strength.

TABLE 1

Components of Photopolymer Composite for 3D Printing System

| Components | Quantity Ranges |
| --- | --- |
| Acrylate Oligomer | 20.0 to 60.0 w % |
| Inorganic Hydrate | 20.0 to 50.0 w % |
| Reinforcing Filler | 5.0 to 60.0 w % |
| UV Initiator | 0.001 to 0.2 w % |
| Dye/pigment | 0.001 to 0.05 w % |

Referencing Table 1, a formulation for a photopolymer composite material for a 3D printing system may include an acrylate oligomer, an inorganic hydrate, a reinforcing filler, and an ultraviolet (UV) initiator. In an embodiment of the formulation the acrylate oligomer may be found ranging between about 20.0-60.0 w % of the formulation. The inorganic hydrate may be found ranging between about 20.0-50.0 w % of the formulation. The reinforcing filler may be found ranging between 5.0-60.0 w % of the formulation. And the UV initiator may be found ranging between about 0.001-0.5 w % of the formulation.

In some configurations, the acrylate oligomer may be Triethylene glycol dimethylacrylate (TEGDMA). Some properties of TEGDMA are found in Table 2.

TABLE 2

Triethylene Glycol Dimethylacrylate (TEGDMA)

| Parameter | Value |
| --- | --- |
| Chemical formula | $CH_2 = C(CH_3)COO(CH_2CH_2O)_3COC(CH_3) = CH_2$ |
| Density g/ML | 1.092 |
| State of Matter | Liquid |
| Color | Transparent |

TEGDMA is a hydrophilic, low viscosity, difunctional methacrylic monomer employed as a crosslinking agent. TEGDMA is a transparent liquid that may found ranging between about 20-60 w % of the formulation.

In some configurations, the inorganic hydrate may be borax decahydrate. Some properties of borax decahydrate may be found in Table 3.

TABLE 3

Borax Decohydrate

| Parameter | Value | |
|---|---|---|
| Chemical formula | $Na_2B_4O_7 \cdot 10H_2O$ | |
| State of matter | Solid powder | |
| Color | White | |
| Foreign impurities | No impurities | |
| Particle Size Distribution | D(10) μm | 110 ± 20 μm |
| | D(50) μm | 310 ± 40 μm |
| | D(90) μm | 700 ± 120 μm |
| | D(max) μm | 2800 ± 300 μm |
| Volume weight, g/cub. cm. | 0.85 | |
| Solubility in Acrylate Monomers | Insoluble | |

The inorganic hydrate may be a borax decahydrate such as sodium borate decahydrate. Borax decahydrate is a solid white powder that may be provided in large bags for industrial use. Borax decahydrate may be found ranging between about 22.0 to 25.0 w % of the formulation when combined with aluminum oxide trihydrate, but is not limited thereto. In some embodiments, the borax decahydrate may be found ranging between 20.0 to 45.0 w % of the formulation.

In some configurations, the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof. Some properties of the aluminum oxide trihydrate that may be shared with the aluminum oxide trihydrate mixture may be found in Table 4.

TABLE 4

Aluminum Oxide Trihydrate

| Parameter | Value | |
|---|---|---|
| Chemical formula | $Al(OH)_3$ | |
| State of matter | Solid powder | |
| Color | White | |
| Foreign impurities | No impurities | |
| Particle Size Distribution | D(10) μm | 5 ± 1 μm |
| | D(50) μm | 25 ± 5 μm |
| | D(90) μm | 85 ± 15 μm |
| | D(max) μm | 200 ± 50 μm |
| Volume weight, g/cub. cm, | 0.7 | |
| Solubility in Acrylate Monomers | Insoluble | |

Aluminum oxide trihydrate, (aluminum hydroxide, ($Al(OH)_3$)) is provided as a solid white powder that is insoluble in the acrylate oligomer. The aluminum oxide trihydrate may be found ranging between about 52.0 to 55.0 w % of the formulation.

In some configurations, the UV initiator may be bisacylphosphine oxides (BAPO)s. Some properties of the BAPO may be found in Table 5.

TABLE 5

Bisacylphasphine Oxides (BAPO)

| Parameter | Value |
|---|---|
| Chemical formula | Phenylbis(2,4,6-trimethylbenzoyl)phosphine oxide |
| State of Matter | Solid Powder |
| Color | Yellowish |
| Solubility in TEGDMA | High solubility |

The UV initiator is the component which starts the polymerization under UV-light of a specified wavelength.

In some configurations, a dye found ranging between about 0.01-0.05 w % of the formulation. Properties of photopolymer composite resin are dependent on the quantity of the components utilized in the formulation. When uncured, the material is thixotropic liquid. The material may be transported through the feeding route by pumps, then extrudes, and then it solidifies under UV-light. When being exposed to UV-light, the substance, which is called an initiator, starts the polymerization reaction, which is exothermic. Table 6 illustrates some properties of the photopolymer composite resin.

TABLE 6

Properties of Liquid Polymer Resin of the Photopolymer Composite

| Parameter | Value |
|---|---|
| Density | 1.35 to 2.00 g/cm³ |
| Maximum cure depth under visible UV-light | 5-15 mm |
| Maximum temperature during polymerization | 60-65° C. |

In some configurations, the upper limit of the density of the liquid polymer resin may be higher, as the density of liquid polymer resin may be due to limitations of the feeding system. In some instances, the upper limit of the density may also be determined by the bulk weight of the fillers utilized in the formulation.

A method of generating a formulation of a photopolymer composite material for use in a 3D printing system may involve combining an acrylate oligomer, ranging between about 20.0-60.0 w % of the formulation, a ultraviolet (UV) initiator, ranging between about 0.001-0.5 w % of the formulation, and a reinforcing filler, ranging between 5.0-60.0 w % of the formulation, in a blender. In the method, a resin premix may be generated by blending the acrylate oligomer, the UV initiator, and the reinforcing filler through operation of the blender for a first amount of time ranging between about 5 and 20 minutes. In the method, the resin premix may be combined with an inorganic hydrate ranging between about 20.0-50.0 w % of the formulation in the blender. In the method, a photopolymer composite resin may be generated by blending the inorganic hydrate and the resin premix through operation of the blender for a second amount of time ranging between about 10 and 14 hours.

In some instances, the photopolymer composite resin is loaded from the blender into a mixing tank of a 3D printing system.

In some instances, the photopolymer composite resin may be loaded from the blender into a second drum for storage. The photopolymer composite resin may then be mixed in the second drum with a mixer after a time interval ranging between 3 hours to 7 days. A mixed photopolymer composite resin may then be transferred from the second drum into the mixing tank of a 3D printing system.

In some configurations, the photopolymer composite resin is combined with a dye ranging between about 0.01-0.05 w % of the formulation in the second drum through operation of the mixer.

In some configurations, the acrylate oligomer may be Triethylene glycol dimethylacrylate (TEGDMA) and may be found ranging between about 23.0 to 27.0 w % of the formulation.

In some configurations, the inorganic hydrate may be borax decahydrate and may be found ranging between about 22.0 to 25.0 w % of the formulation.

In some configurations, the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof.

In some configurations, the aluminum oxide trihydrate may be found ranging between about 52.0 to 55.0 w % of the formulation.

In some configurations, the UV initiator may be bisacylphosphine oxides (BAPO)s.

Figure 1:
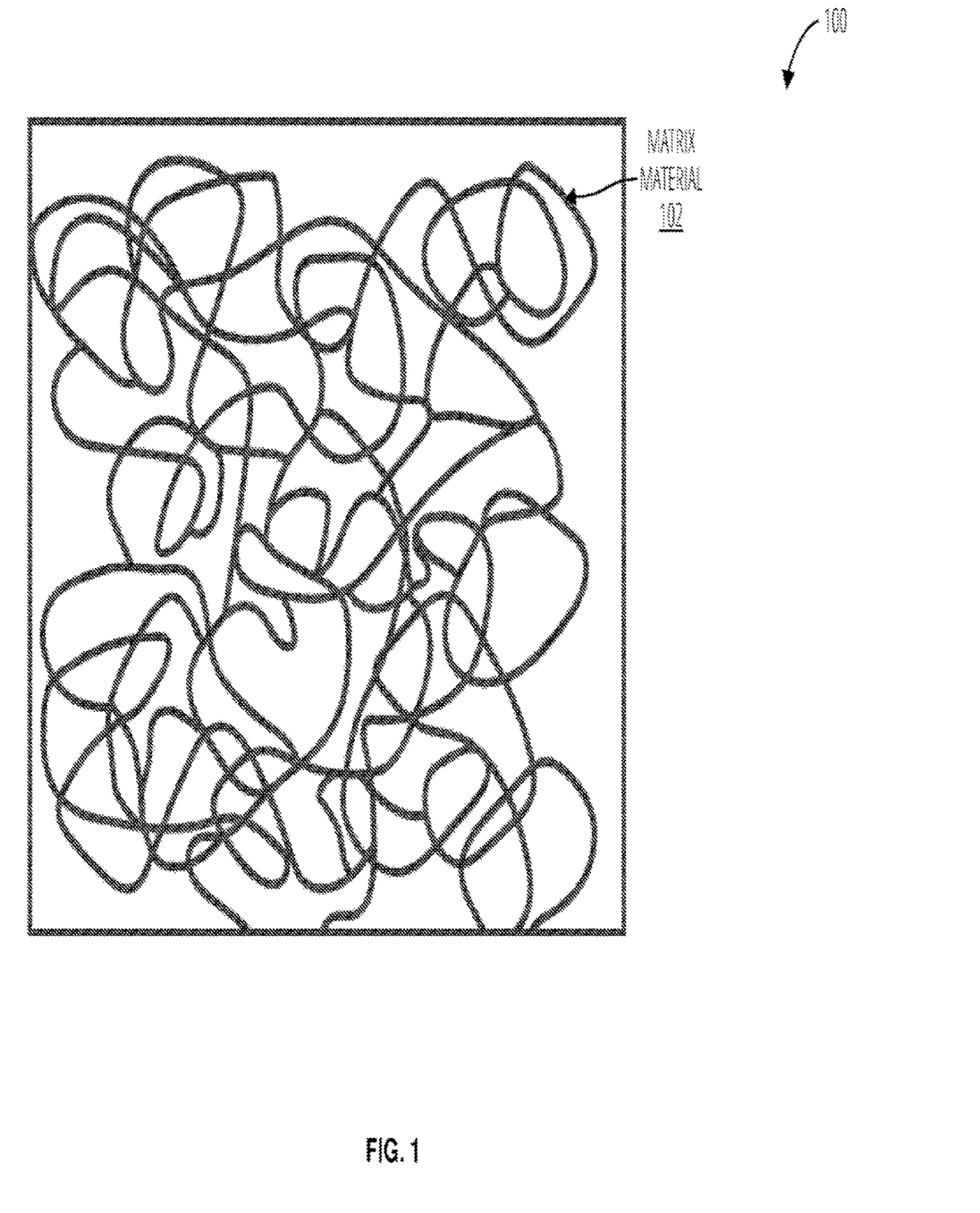
FIG. 1 illustrates an end material 100 in accordance with one embodiment.

FIG. 1 shows an exemplary end material 100 that may be produced via 3D printing. The end material 100 is shown as including a matrix material 102. The matrix material 102 may be formed via 3D printing.

Exemplary matrix material 102 may include a polymeric material. In one embodiment, the polymeric material may include one or more acrylic polymers. An exemplary acrylic polymer may include any polymer that is a product of polymerization of an acrylic acid, an acrylate (or ester of an acrylic acid), and/or a derivative thereof.

The end material 100 may be formed by any suitable methods. An exemplary method may include polymerization. Exemplary polymerization may include photopolymerization, such as radical photopolymerization. In one embodiment, the end material 100 may be formed by a 3D printing process that is based on photopolymerization. Exemplary 3D printing process may include stereolithography (or SLA, SL, optical fabrication, photo-solidification, resin printing), binder jetting, directed energy deposition, material jetting, powder bed fusion, sheet lamination, vat photopolymerization, or a combination thereof.

Figure 2:
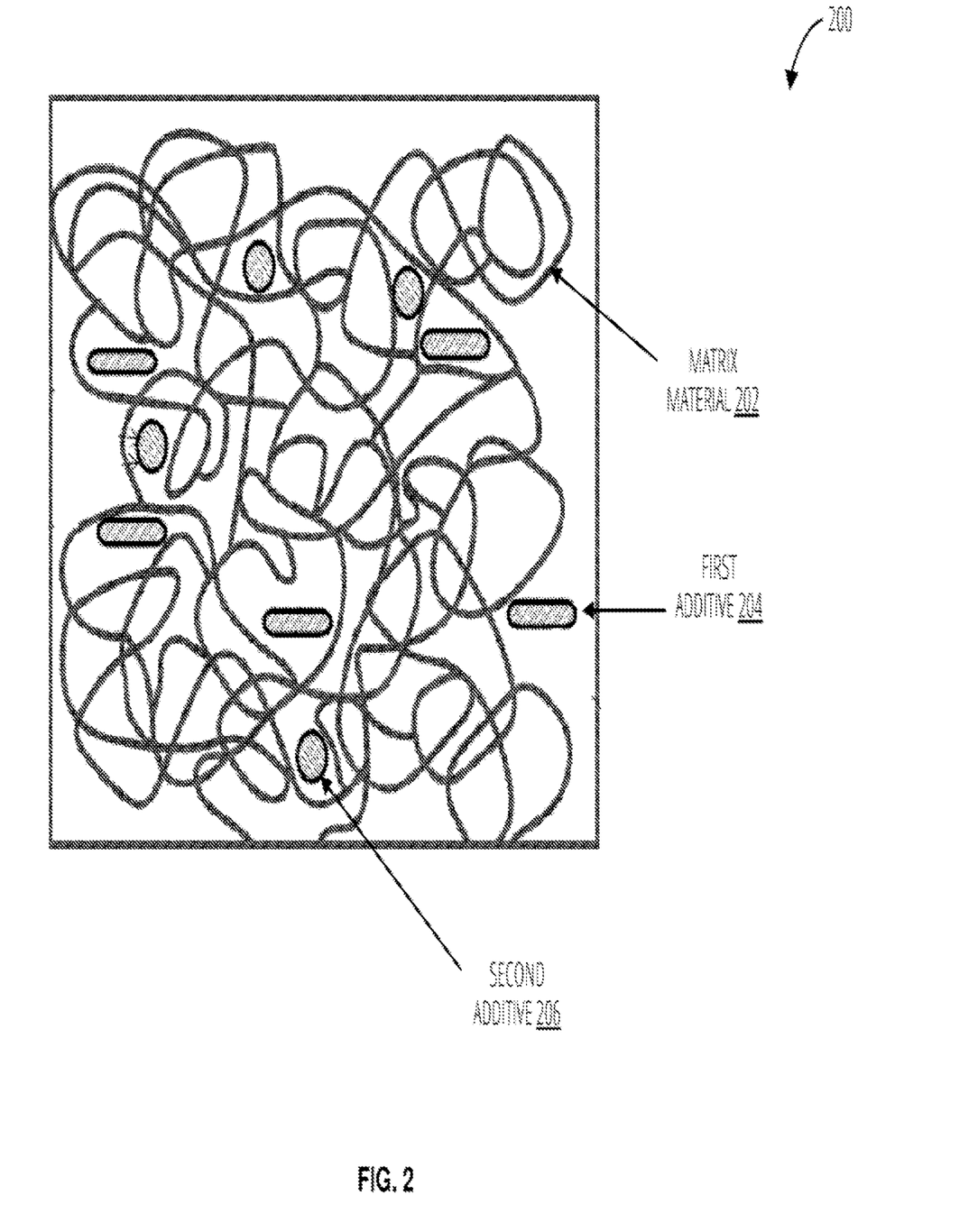
FIG. 2 illustrates an end material 200 in accordance with one embodiment.

Referencing FIG. 2, the end material 200 is shown as including at least one additive each being embedded and/or mixed within the matrix material 202 at a selected concentration, respectively. Each additive may include particles and/or compounds that possess one or more selected properties. Advantageously, the properties of the additive may be imparted to the end material 200. As illustratively shown in FIG. 2, the additive may include first additive 204 and second additives 206. Each of the first additive 204 and second additive 206 may provide a respective function to the end material 200.

In one embodiment, the additive may include a reinforcing additive. The reinforcing additive may improve mechanical properties of the end material 200. For example, the reinforcement additive may increase tensile, flexural and compressive strength of the end material 200 and/or decrease shrinkage of the end material 200 before and after 3D printing. Exemplary reinforcing additive may include calcium carbonate, talc, silica, wollastonite, clay, calcium sulfate fibers, mica, glass beads, glass fibers, or a combination thereof. The reinforcing additive may be mixed in the end material 200 in the form of particles. The reinforcing additive particles may be in the form of round and freeform granules, microcrystals of various shapes, fibers, threads, or a combination thereof. The reinforcing additive may be embedded in the end material 200 at any suitable concentrations. For example, mass percentage (or weight percentage) of the reinforcing additive in the end material 200 may range between about 5 to 70 w %, or from 30 to 50 w % of the end material 200.

Additionally and/or alternatively, the at least one additive may include a flame-retardant additive. In one embodiment, the flame-retardant additive may be mineral-based and/or mineral-occurred. Stated somewhat differently, the flame-retardant additive may be of a natural origin. For example, the flame-retardant additive may be derived from a mineral. Exemplary flame-retardant additives may include aluminum oxide trihydrate, sodium tetraborate decahydrate, boric acid, sodium phosphate, ammonium sulfate, sodium tetraborate, aluminum hydroxide, or a combination thereof. In contrast to common halogen-based flame retardants, use of the mineral-based flame-retardant additive may eliminate presence of toxic substances in combustion products and advantageously be environmentally beneficial.

Additionally and/or alternatively, the mineral-based flame-retardant additive may be more resistant to blooming than non-mineral-based flame retardants including phosphoric acid esters, aluminum polyphosphate, red phosphorus and other halogen-free flame retardants. Advantageously, the functional stability of the end material 200 does not degrade with the passage of time. The flame-retardant additive may be embedded in the end material 200 in the form of particles. The reinforcing additive particles may be in the form of round and freeform granules, microcrystals of various shapes, or a combination thereof. The flame-retardant additive may be mixed in the end material 200 at any suitable concentrations. For example, mass percentage of the flame-retardant additive in the end material 200 may range between about 35 to 75 w %, or from about 45 to 65 w % of the end material 200.

Additionally and/or alternatively, the at least one additive may include a coloring agent for coloring the end material 200. Exemplary coloring agents may include a pigment, a dye, or a combination thereof. Additionally and/or alternatively, the at least one additive may include a glittering agent for providing a glittering effect to appearance of the end material 200. Additionally and/or alternatively, the at least one additive may include an aromatic agent for generating an aromatic smell from the end material 200. Advantageously, the end material 200 may have a monolithic amorphous structure with low porosity. The end material 200 may be stronger and lighter than concrete and brick, and resistant to moisture and chemicals. Exemplary end material 200 may be made by curing non-toxic acrylic-based oligomers and a minimal quantity of photoinitiator, so the making of end material 200 may be safer for health.

Although FIG. 2 shows the end material 200 as including the first additive 204 and the second additive 206 for illustrative purposes only, the end material 200 may include no additives, or may include any number of uniform and/or different additives, without limitation. Use of the same matrix material 202 with various combinations of the additives in the end material 200 allows obtaining the end material 200 for a wide range of applications.

Figure 3:
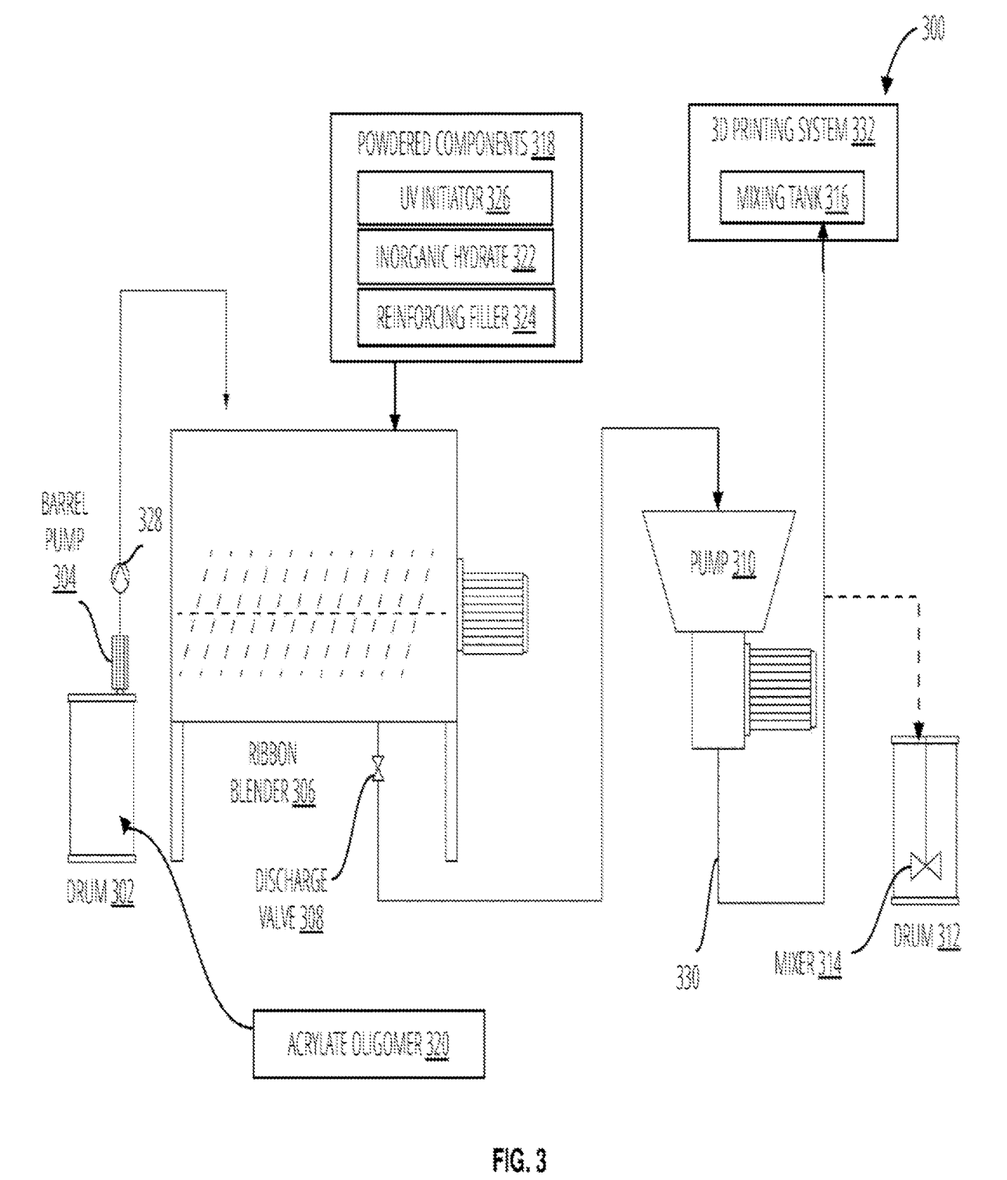
FIG. 3 illustrates a system 300 in accordance with one embodiment.

FIG. 3 illustrates an embodiment of a system 300 for generating the photopolymer composite resin for use in a 3D printing system. The system 300 comprises a drum 302, a barrel pump 304, a flow meter 328, a ribbon blender 306, a discharge valve 308, a pump 310, and a mixing tank 316 of a 3D printing system 332.

A drum 302 comprising the acrylate oligomer 320 may be moved to the location of the barrel pump 304. The lid of the drum 302 is cleaned to remove any dust. A special tool to remove the barrel cap (the larger of the two on the drum's lid) is utilized and placed on the lid of the drum. The level of acrylate oligomer 320 inside the drum is measured and should be between about 1-3" from the top. A barrel pump 304 is installed into the cap hole of the barrel in a vertical position. The barrel pump 304 is placed in fluid communication with a ribbon blender 306 that has been emptied and has the discharge valve 308 is in "closed" position. The barrel pump 304 is activated and the flow rate of the acrylate oligomer 320 into the ribbon blender 306 is monitored through a flow meter 328. The barrel pump 304 is turned off soon as the required volume of the acrylate oligomer 320 is reached inside the ribbon blender 306. If the drum 302 is emptied during the pumping procedure, the barrel pump 304 is turned off and reinstalled it into the next drum to continue pumping.

After the acrylate oligomer is added to the ribbon blender 306, the powdered components 318 may be added into the ribbon blender. The powdered components 318 comprise the UV initiator 326, the inorganic hydrate 322, and the reinforcing filler 324.

The UV initiator 326 may be added to the acrylate oligomer 320 within the ribbon blender 306 ranging between about 0.001 to 0.2 w % of the formulation. The UV initiator 326 is loaded into the ribbon blender 306. The empty container of the UV initiator is weighted to ensure that the desired amount of UV initiator 326 was added to the ribbon blender 306. If some amount of UV initiator was not loaded into the ribbon blender 306, the loading procedure should be repeated. After the UV initiator 326 has been added, the container is closed to protect the powder from sunlight and moisture.

The reinforcing filler 324 may be added after the UV initiator 326. In some instances, the reinforcing filler 324 comes in 55 lb bags. To ensure that correct amount of the reinforcing filler 324 is added, the bag of the reinforcing filler 324 is placed on a floor scale and weighted to obtain the total mass of the load. A safety grating is installed within ribbon blender 306 and the bag of the reinforcing filler is opened and loaded into the ribbon blender 306 through the safety grating. When the bag is emptied after loading, the empty bag is weighed. A calculation is performed to calculate the mass of reinforcing filler inside the ribbon blender 306 by subtracting the weight of the emptied bag from the total mass weight taken initially. Additional quantities of the reinforcing filler are added to the ribbon blender 306 to meet the quantity range of about 5.0 to 60.0 w % of the formulation. The ribbon blender 306 is then turned on for about 10 minutes to form a premix resin from the components before adding the inorganic hydrate.

The inorganic hydrate 322 may be added after the reinforcing filler 324. In some instances, the inorganic hydrate 322 comes in 55 lb bags. To ensure that correct amount of the inorganic hydrate 322 is added, the bag of the inorganic hydrate 322 is placed on a floor scale and weighted to obtain the total mass of the load. A safety grating is installed within ribbon blender 306 and the bag of the inorganic hydrate 322 is opened and loaded into the ribbon blender 306 through the safety grating. When the bag is emptied after loading, the empty bag is weighed. A calculation is performed to calculate the mass of inorganic hydrate inside the ribbon blender 306 by subtracting the weight of the emptied bag from the total mass weight taken initially. Additional quantities of the inorganic hydrate are added to the ribbon blender 306 to meet the quantity range of about 20.0 to 50.0 w % of the formulation. Once the desired quantity has been loaded into the ribbon blender 306, the ribbon blender 306 is powered on to run for 12 hours in order to mix the components.

The ribbon blender 306 is turned off and allowed to stop after running for about 12 continuous hours. The pump 310 is then positioned underneath a discharge valve 308 of the ribbon blender 306. In an embodiment, the pump 310 is then connected to the mixing tank 316 of a large gantry 3D printing system 332 through the use of a hose 330. Any appropriate 3D printing system may be used, and the disclosure is not limited to the large gantry 3D system. The gantry system (GS) mixing tank 316 is inspected to ensure that it is operational and that ready to receive the mixed components as a resin. The pump is turned on before the discharge valve 308 is moved into the "open" position. The GS mixing tank is then inspected to ensure that the photopolymer composite resin is being collected. As soon as the flow rate of the resin pouring from the ribbon blender 306 starts to decrease, the ribbon blender 306 is turned on to push the remnants of the resin into the pump's hopper. The pumping procedure ends when the ribbon blender 306 is emptied at which point the blender and the pump are turned off.

In some instances, the GS mixing tank 316 may be unavailable to receive the photopolymer composite resin, the resin may be loaded into a storage drum (storage drum 312). The hose connected to the pump is positioned and secured within the storage drum 312 instead of the GS mixing tank. The pump is turned on before the discharge valve 308 is moved into the "open" position. As soon as the flow rate of the resin pouring from the ribbon blender 306 starts to decrease, the ribbon blender 306 is turned on to push the remnants of the resin into the pump's hopper. The photopolymer composite resin from the ribbon blender 306 may be pumped into at least one storage drum 312 due to total volume of the resin within the blender. If a pump cannot be used, an empty drum is placed underneath the discharge valve 308 and the discharge valve 308 is opened to pour the photopolymer composite resin into the drum. The discharge valve 308 is then closed as soon as the drum is full.

Before printing with the photopolymer composite resin stored in one of the storage drum 312s, the resin requires some mixing. A mixer 314 such as a manual mixer may be utilized to mix the resin before transferring the resin to a GS mixing tank. The lid of the storage drum 312 may be opened and the paddle of the mixer may be positioned into the drum between the center of the drum and the inner wall. The upper layer of the resin may be mixed by moving the paddle clockwise while it is on. The upper layer of the resin is mixed until the upper layer of the drum becomes homogenous. The paddle may then be pushed to the bottom of the drum. The bottom layer may then be mixed by moving the paddle outward from the center. The paddle may then be lifted towards the upper layer of the resin near the inner wall of drum and pushed back down towards the bottom of the drum while being moved in a counter clockwise rotation around the center of the drum. The mixing continues until the resin is homogenous.

To prevent the contamination of the inner surface of the blender with the dye which will influence the production of uncolored resin, the coloring procedure may be carried in one of the storage drums and then labeled in accordance with the color of the dye used.

The necessary amount of dye is weighed out and placed into a layer of resin within the drum. A manual mixer may be utilized to mix the dye with the photopolymer composite resin. After the dye has been added, the resin in the drum may be mixed again after about 24 hours of storage before it is ready to be transferred to the GS mixing tank for use in 3D printing.

After about 12 hours of continuous mixing, the photopolymer composite resin may be considered to be ready for use. The photopolymer composite resin may require handling while in storage. In cases when the resin is pumped into the GS mixing tank, it may be mixed continuously until it is all consumed. Up to about 3 hours without mixing is acceptable. In cases where the resin is kept in drums for long-term storage, the following requirements must be met:

Drums must be sealed at all times
Avoid exposing the resin to light and moisture
No foreign impurities are allowed in the drum
Once every 7 days, the resin may be manually mixed
No printing with the resin is possible after about 3 hours of staying unmixed In some instances, the resin undergoes a quality assurance process. After the resin has been mixed for about 12 continuous hours a 500 mL batch is taken for testing. Three samples are to be obtained while pumping the batch out from ribbon blender. All the samples are to be taken from the hose end to the GS mixing tank or in the second drum.

The first sample may be taken in the amount of about 150-200 mL 10-15 seconds after start of pumping procedure. The second sample may be taken in the amount of about 150-200 mL in the middle of the pumping procedure. The third sample may be taken in the amount of about 150-200 mL 10-15 seconds before the end pumping procedure.

In case of drum storage, the sampling procedure is as follows:

A first sample of about 150-200 mL may be taken from the first drum
A second sample of about 150-200 mL may be taken from the second drum
A third sample of about 150-200 mL may be taken from the third drum The storage produced utilized three different drums since a single load of the mixer may be equal to three drums volume. About 100 mL from each sample may be put into a glass or PE container, mixed well and sealed for the QA procedures.

Figure 4:
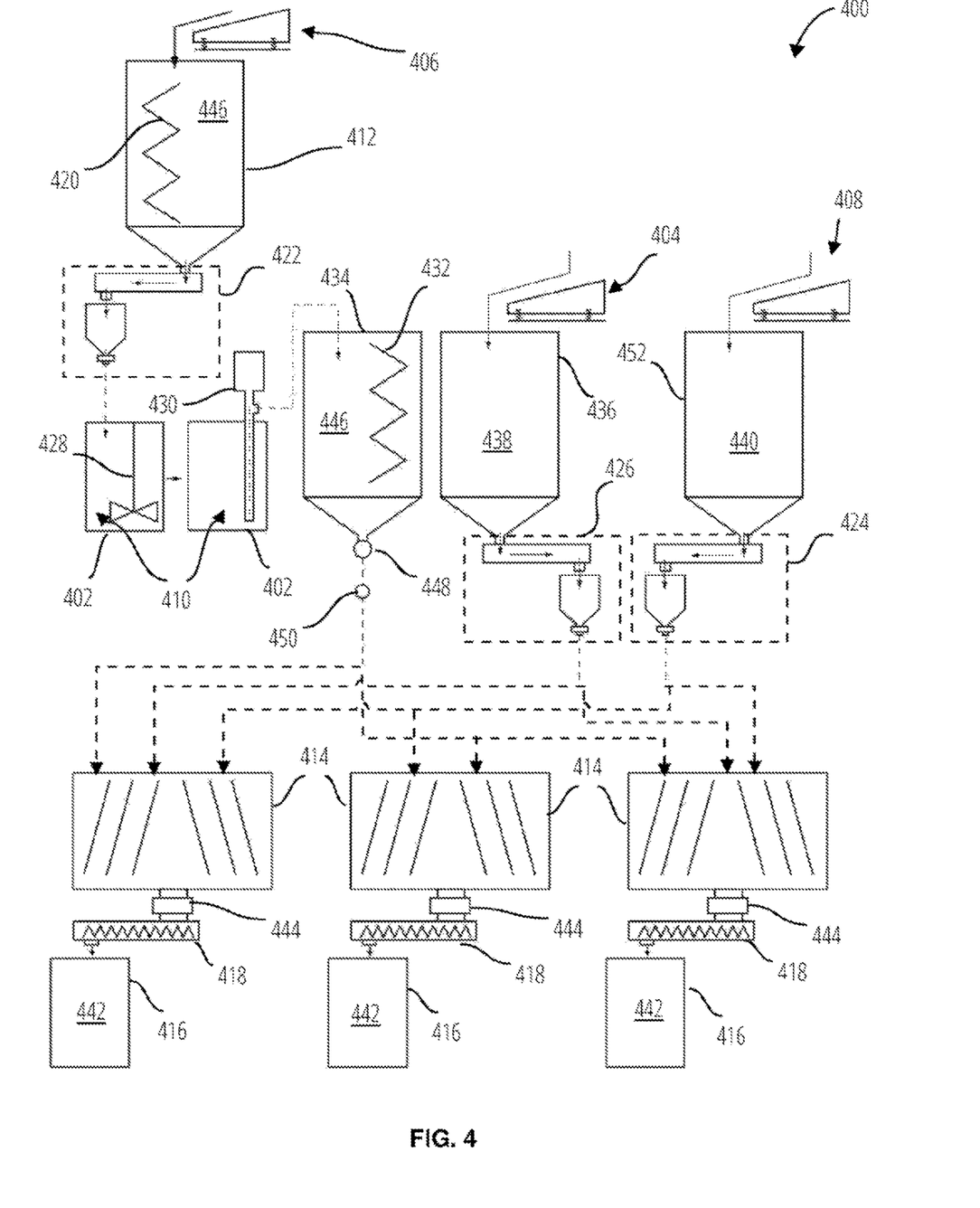
FIG. 4 illustrates a system 400 in accordance with one embodiment.

FIG. 4 illustrates an example embodiment of an industrial system 400 for producing the photopolymer-based composite material formulation. The system 400 is an example of a configuration for handling large volumes of the initial compounds utilized in the production of the formulation. In the system 400 an oscillating sleeve 406 feeds the initiator oligomer mixture 446 into a hopper 412 at a controlled speed. An agitator 420 within the hopper 412 is utilized to feed the initiator oligomer mixture 446 into a dosing machine 422 comprising a feeder, a weight hopper, and a valve, that feeds the initiator oligomer mixture 446 into a drum 402 comprising the acrylate oligomer 410. A mixer 428 is placed into the drum 402 and mixes the acrylate oligomer 410 and the initiator oligomer mixture 446. After the initiator oligomer mixture 446 and the acrylate oligomer 410 have been mixed, a drum pump 430 transfers the mixture (initiator oligomer mixture 446) from the drum 402 into a hopper 434. The hopper 434 includes an agitator 432 that keeps the initiator oligomer mixture 446 from separating. Concurrently, an oscillating sleeve 404 is utilized to load the reinforcing filler 438 into a hopper 436, and an oscillating sleeve 408 is utilized to load the inorganic hydrate 440 into hopper 452.

Following the loading of hopper 434, hopper 436, and hopper 452, a pump 448 transports the initiator oligomer mixture 446 from the hopper 434 to a plurality of ribbon blenders 414 with the flow of the initiator oligomer mixture 446 being monitored by a flow meter 450. A dosing machine 426 transfers the reinforcing filler 438 from the hopper 436 to the plurality of ribbon blenders 414, as well as a dosing machine 424 transfers the inorganic hydrate 440 from the hopper 452 to the plurality of ribbon blenders 414. The plurality of ribbon blenders 414 blends the initiator oligomer mixture 446 with the inorganic hydrate 440 and the reinforcing filler 438 for a period of time until the formulation 442 is released through a valve 444 into a feeder 418 that loads the formulation 442 into at least one GS mixing tank 416.

Figure 5:
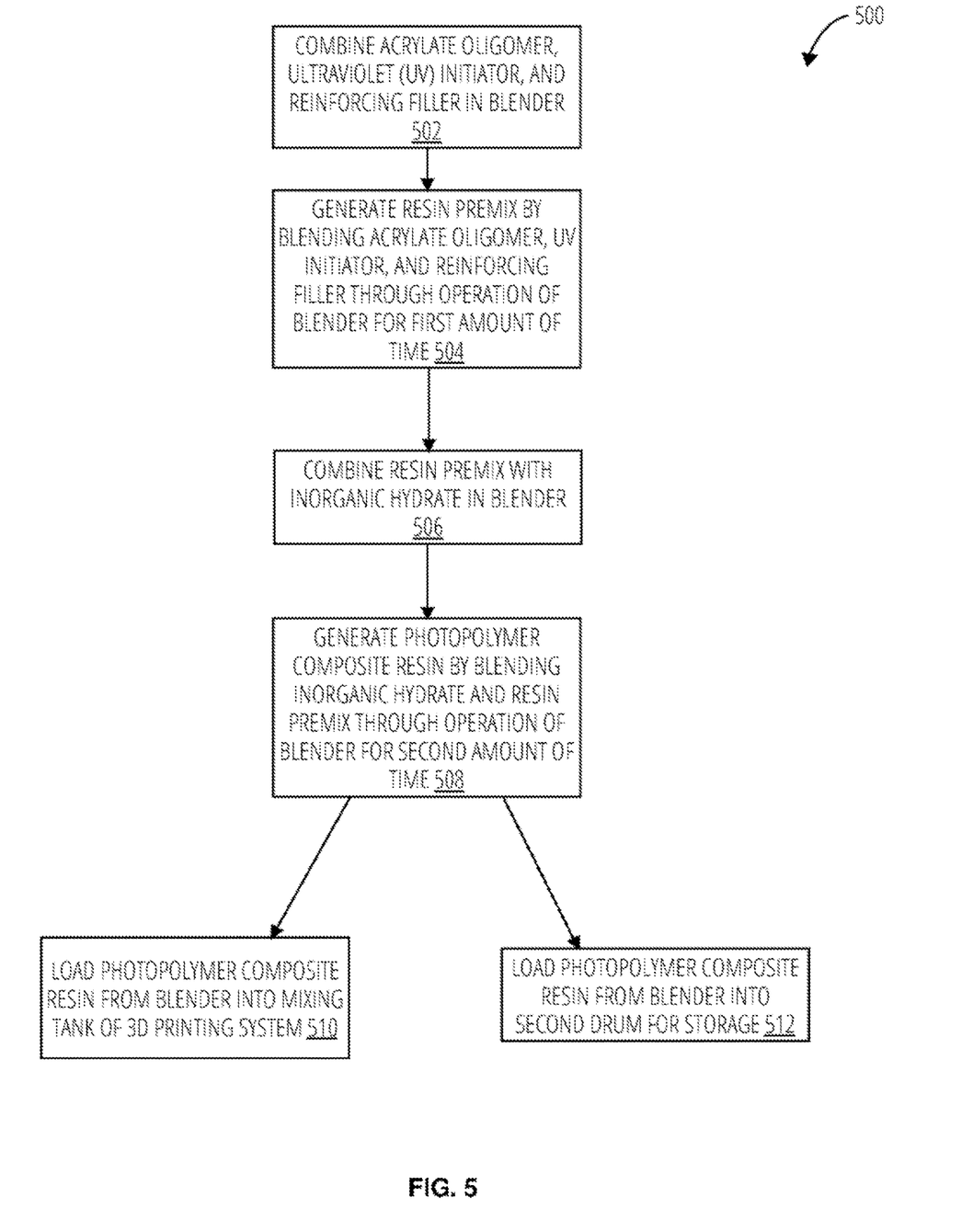
FIG. 5 illustrates a method 500 in accordance with one embodiment.

Referencing FIG. 5, a method 500 of generating a formulation of a photopolymer composite material for use in a 3D printing system involves combining an acrylate oligomer, ranging between about 20.0-60.0 w % of the formulation, a ultraviolet (UV) initiator, ranging between about 0.001-0.5 w % of the formulation, and a reinforcing filler, ranging between about 5.0-60.0 w % of the formulation, in a blender (block 502). In block 504, the method 500 generates a resin premix by blending the acrylate oligomer, the UV initiator, and the reinforcing filler through operation of the blender for a first amount of time ranging between about 5 and 20 minutes±–0.5 minutes. In block 506, the method 500 combines the resin premix with an inorganic hydrate ranging between about 20.0-50.0 w % of the formulation in the blender. In block 508, the method 500 generates a photopolymer composite resin by blending the inorganic hydrate and the resin premix through operation of the blender for a second amount of time ranging between about 10 and 14 hours±0.1 hours.

In some configurations, the method 500 loads the photopolymer composite resin from the blender into a mixing tank of a 3D printing system (block 510).

In some instances, the mixing tank is not available and the method 500 loads the photopolymer composite resin from the blender into a second drum for storage (block 512). The photopolymer composite resin stored in the second drum may be mixed with a mixer after a time interval ranging between about 3 hours to 7 days±0.2 hours before it is transferred from the second drum into a mixing tank of a 3D printing system.

Figure 6:
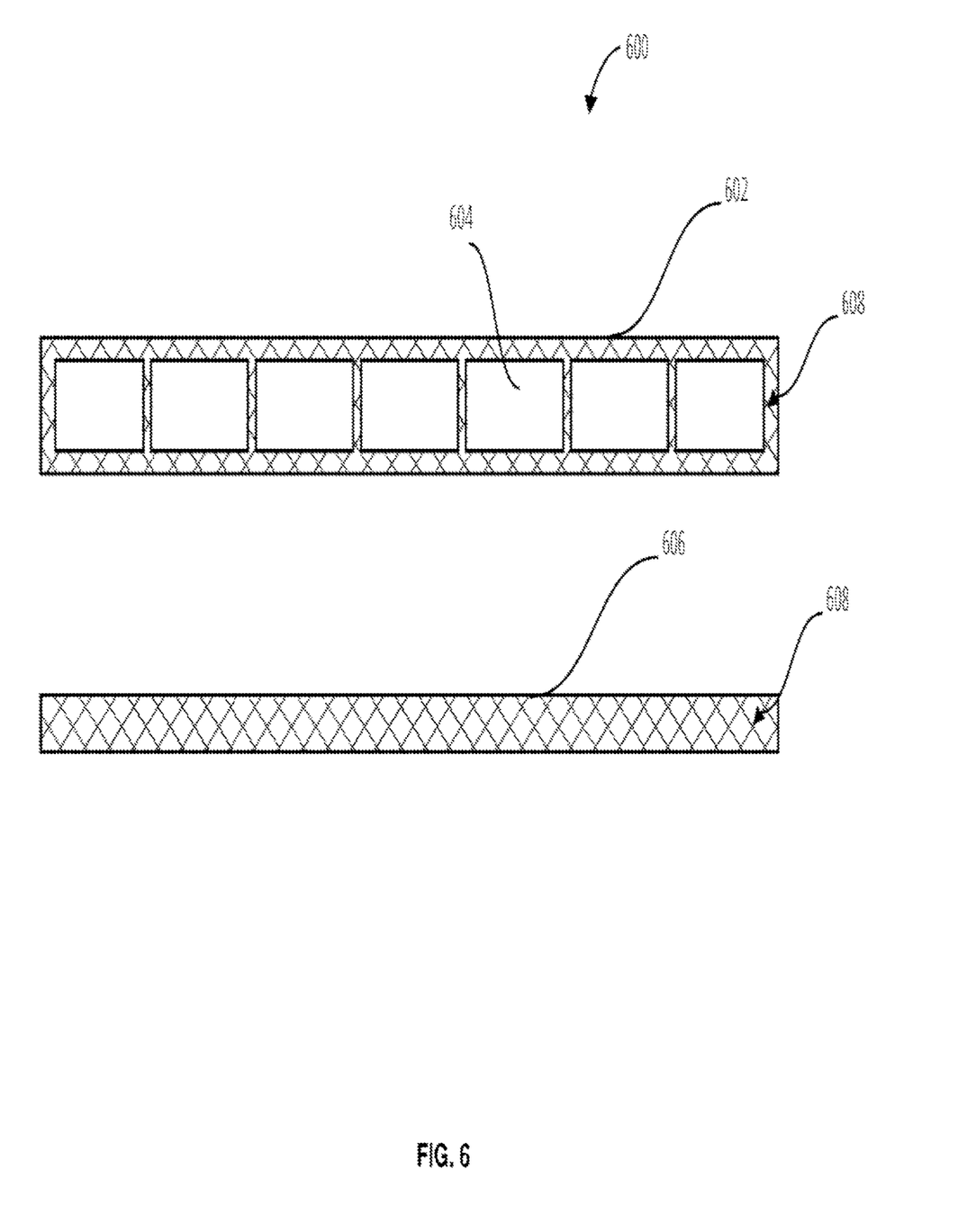
FIG. 6 illustrates cellular structure concepts 600 in accordance with one embodiment.

FIG. 6 illustrates cellular structure concepts 600 comprising a structural wall 602, hollowed out portions 604, and an in-fill pattern 608. While the structural wall 606 comprises just the in-fill pattern 608. A wall structure with a special infill pattern may be utilized to increase material load bearing capacity without using additional reinforcement. The structural layers are printed using a cellular structure for better tensile strength and integrity. The 3D printing method allows the building of structural elements with different geometries which are much better able to sustain loads compared to many materials commonly used in construction today.

Using a structural photopolymer-based composite in a solid state (without reinforcement threads or cell structure), internal testing indicates that the material is stronger than B25 and other commonly used concretes. This allows the building of solid structures with much greater material efficiency and supporting a much wider range of design possibilities than traditional methods (so called free-form architecture).

The use of a cellular structure may be able to reinforce the inherent strength of the photopolymer composite. Using the dimensional structure of a slab (ceiling board), the moment of inertia around the bending axis was raised by a factor of 10 compared to a solid section of the same area. Thus, the deformation of the slab was reduced by the same 10×.

The polymer has both greater compressive strength and elasticity than either concrete or brickwork. This may allow for the construction of buildings that are lighter and less prone to collapse: more compressive strength provides walls and floors with a high load-bearing capacity at a lower overall weight, while elasticity helps a structure to withstand deformations caused by overloads or unexpected environmental impacts (such as earthquakes). The lightweight construction lowers loads on the foundation reducing construction costs.

TABLE 7

Properties of 3D Printed Photopolymer composite Material

|  | Value |
|---|---|
| Mechanical properties | |
| Ultimate compressive strength | 66 ± 3 MPa |
| Compressive Young's modulus | 5600 ± 200 MPa |
| Relative compressive deformation | 3.8 ± 0.5% |
| Ultimate tensile strength | 7.6 ± 0.9 MPa |
| Tensile Young's modulus | 4400 ± 400 MPa |
| Relative tensile deformation | 0.18 ± 0.03% |
| Ultimate flexural strength | 15 ± 1 MPa |
| Flexural Young's modulus | 9200 ± 250 MPa |
| Relative flexural deformation | 0.19 ± 0.01% |
| Thermal properties | |
| Thermal conductivity | 0.42 ± 0.03 W/m · K |
| Thermal capacity | 1430.1 ± 225.0 J/kg · K |
| Fire safety | |
| Flame spread index | 0-25 |
| Smoke development index | 275 |
| Environmental impact | |
| Moisture test | Pass |
| Salt fog test | Pass |
| Thermal cycling from −60° C. to +60° C. | Pass |
| Sun radiation test | Pass |
| Fungal stability | Pass |

The printed photopolymer composite material is an object which consist of many flat horizontal layers, with layer height in range from about 3 to 10 mm. The total structure of printed objects has some anisotropy of mechanical properties, because of layer-by-layer deposition. Some properties of the photopolymer composite material may be shown in Table 7.

To achieve a fire protection rating (FSR) below 25, the following additives are included in the formulation: sodium tetraborate, boric acid and aluminum oxide trihydrate. These are inorganic additives of intumescent action (i.e. they swell when heated). When the photopolymer composite material burns, it produces water vapor and a protective crust of refractory alumina. Simply speaking, the polymer is self-extinguishing. Layers of different thickness may allow the formulations to achieve the target properties of FSR<25 under the NFPA (National Fire Protection Association) 255 Standard and allow the material to exhibit noncombustible/self-extinguishing properties.

The photopolymer composite material underwent open-fire tests comparing the performance of a wall with modern Structural Insulated Panels (SIPs) comprising gypsum board, oriented strand board (OSB), and insulation foam.

The photopolymer composite material was tested with a width of 12 mm against gypsum board of the same width to confirm its superior fire-resistant properties as stand-alone material. After 20 and 60 min open-fire tests, board made from the photopolymer composite material has received much less damage than the gypsum board. As a result, the wall panel with the photopolymer composite material demonstrated much better performance across a number of parameters. The designed fire-resistant properties greatly outperform those of gypsum-carton board, the most commonly used thermal barrier material in the United States.

Additionally, the formed resin may provide weather protection without cavities or seams (which are inevitable with any modular construction). This may be due to the unique printing method as well as the hydrophobic nature of the material. Due to the nature of the photopolymer composite, the system may be able to create waterproof walls across the exterior of a structure. Apart from moisture, the exterior barrier of the structure may be also able to protect the internal wall structure from wind, dust, and other external influences such as UV light. Another important climatic characteristic is thermal resistance (the inverse of thermal conductivity), expressed as the R-value.

Table 8 shows an example embodiment of the formulation for the photopolymer composite material for use in a 3D printing system.

TABLE 8

Example formulation of Photopolymer Composite for 3D Printing System

| Components | Quantity Ranges |
|---|---|
| Triethylene Glycol Dimethacrylate (TEGDMA) | 23.0 to 27.0 w % |
| Borax Decahydrate | 22.0 to 25.0 w % |
| Aluminum Oxide Trihydrate | 52.0 to 55.0 w % |
| Bisacylphosphine Oxide(BAPO) | 0.001 w % |

Table 9 shows some mechanical properties of the 3D printed photopolymer composite material.

TABLE 9

Properties of 3D Printed Photopolymer Composite Material

| Mechanical properties | Value |
|---|---|
| Ultimate compressive strength | 66 ± 3 MPa |
| Compressive Young's modulus | 5600 ± 200 MPa |
| Relative compressive deformation | 3.8 ± 0.5% |
| Ultimate tensile strength | 7.6 ± 0.9 MPa |
| Tensile Young's modulus | 4400 ± 400 MPa |
| Relative tensile deformation | 0.18 ± 0.03% |
| Ultimate flexural strength | 15 ± 1 MPa |
| Flexural Young's modulus | 9200 ± 250 MPa |
| Relative flexural deformation | 0.19 ± 0.01% |

Table 10 shows the components and quantity of Test formulation #1. Test formulation #1 differs from the formulation for the in Table 8 in that the reinforcing filler is quartz powder.

TABLE 10

Test Formulation #1

| Component Category | Components | Quantity |
|---|---|---|
| Acrylate Oligomer | TEGDMA | 23.0 w % |
| Inorganic Hydrate | Borax decahydrate | 26.0 w % |

TABLE 10-continued

Test Formulation #1

| Component Category | Components | Quantity |
| --- | --- | --- |
| Reinforcing Filler | Quartz powder | 51.0 w % |
| UV-Initiator | BAPO | 0.001 w % |

Table 11 shows some mechanical properties of Test formulation #1.

TABLE 11

Properties of Test Formulation #1

| Mechanical properties | Value |
| --- | --- |
| Ultimate compressive strength | 56 MPa |
| Compressive Young's modulus | 2500 MPa |
| Relative compressive deformation | 3% |
| Ultimate tensile strength | 8 MPa |
| Tensile Young's modulus | 260 MPa |
| Relative tensile deformation | 3% |
| Ultimate flexural strength | 18 MPa |
| Flexural Young's modulus | 7900 MPa |
| Relative flexural deformation | 0.26% |

When the mechanical properties of test formulation #1 and the example formulation are compared, the example formulation has a higher ultimate compressive strength, higher compressive young's modulus, and a slightly higher compressive deformation. Compared to the example formulation, Test formulation #1 has a higher ultimate tensile strength and relative tensile deformation, but significantly lower value for the Tensile Young's modulus. The Test formulation #1 has a higher ultimate flexural strength and a higher relative flexural deformation but a lower flexural young's modulus value compared to the example formulation.

Table 12 shows the components and quantities for Test formulation #2. Test formulation #2 differs from the example formulation in Table 8 by the low amount of borax decahydrate and a higher amount of the quartz powder as the reinforcing filler.

TABLE 12

Test Formulation #2

| Component Category | Components | Quantity |
| --- | --- | --- |
| Acrylate Oligomer | TEGDMA | 25.0 w % |
| Inorganic Hydrate | Borax decahydrate | 15.0 w % |
| Reinforcing Filler | Quartz powder | 60.0 w % |
| UV-Initiator | BAPO | 0.001 w % |

Table 13 shows some mechanical properties of Test formulation #2

TABLE 13

Properties of Test Formulation #2

| Mechanical Properties | Value |
| --- | --- |
| Ultimate compressive strength | 70 MPa |
| Compressive Young's modulus | 2500 MPa |
| Relative compressive deformation | 3.6% |
| Ultimate tensile strength | 10 MPa |
| Tensile Young's modulus | 280 MPa |
| Relative tensile deformation | 3.5% |

TABLE 13-continued

Properties of Test Formulation #2

| Mechanical Properties | Value |
| --- | --- |
| Ultimate flexural strength | 24 MPa |
| Flexural Young's modulus | 9400 MPa |
| Relative flexural deformation | 0.3% |

When the mechanical properties of test formulation #2 and the example formulations are compared, Test formulation #2 has a higher ultimate compressive strength value, but lower compressive Young's modulus value and relative compressive deformation values. Test formulation #2 also has a higher ultimate tensile strength value and relative tensile deformation value, but lower Tensile Young's modulus value. Additionally, Test formulation #2 has higher values for ultimate flexural strength, Flexural Young's modulus, and relative flexural deformation.

Table 14 shows components and quantities for test formulation #3. Test formulation #3 differs from the example formulation in Table 8 by completely omitting the reinforcing filler.

TABLE 14

Test Formulation #3

| Component Category | Components | Quantity |
| --- | --- | --- |
| Acrylate Oligomer | TEGDMA | 30.0 w % |
| Inorganic Hydrate | Borax decahydrate | 70.0 w % |
| Reinforcing Filler | — | 0.0 w % |
| UV-Initiator | BAPO | 0.001 w % |

Table 15 shows some mechanical properties for test formulation #3.

TABLE 15

Properties of Test Formulation #3

| Mechanical Properties | Value |
| --- | --- |
| Ultimate compressive strength | 61 MPa |
| Compressive Young's modulus | 2300 MPa |
| Relative compressive deformation | 4.4% |
| Ultimate tensile strength | 5 MPa |
| Tensile Young's modulus | 1280 MPa |
| Relative tensile deformation | 0.25% |
| Ultimate flexural strength | 20 MPa |
| Flexural Young's modulus | 4300 MPa |
| Relative flexural deformation | 0.19% |

When the mechanical properties of test formulation #3 and the example formulation are compared, test formulation #3 has lower ultimate compressive strength values and lower compressive Young's modulus values, but a slightly higher relative compressive deformation value. Test formulation #3 also has lower ultimate tensile strength values, and Tensile Young's modulus value, but a slightly higher relative tensile deformation value. Additionally, Test formulation #3 has a higher ultimate flexural strength value and lower flexural Young's modulus value. Test formulation #3 and the Example formulation appear to have the same relative flexural deformation value.

The methods and formulations in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

The invention claimed is:

1. A method of generating a formulation of a photopolymer composite material for use in a 3D printing system, the method comprising:
combining an acrylate oligomer, in the range between about 20.0-60.0 w % of the formulation, a ultraviolet (UV) initiator, in the range between about 0.001-0.5 w % of the formulation, and a reinforcing filler, in the range between about 5.0-60.0 w % of the formulation, in a blender;
generating a resin premix by blending the acrylate oligomer, the UV initiator, and the reinforcing filler through operation of the blender for a first amount of time;
combining the resin premix with an inorganic hydrate in the blender, wherein the inorganic hydrate is borax decahydrate and is in the range between about 22.0 to 25.0 w % of the formulation; and
generating a photopolymer composite resin by blending the inorganic hydrate and the resin premix through operation of the blender for a second amount of time.

2. The method of claim 1, further comprising:
loading the photopolymer composite resin from the blender into a mixing tank of the 3D printing system.

3. The method of claim 1, further comprising:
loading the photopolymer composite resin from the blender into a second drum for storage;
mixing the photopolymer composite resin in the second drum with a mixer after a time interval in the range between about 3 hours and 7 days; and
transferring a mixed photopolymer composite resin from the second drum into a mixing tank of the 3D printing system.

4. The method of claim 3 further comprising:
combining the photopolymer composite resin with a dye in the range between about 0.01-0.05 w % of the formulation in the second drum through operation of the mixer.

5. The method of claim 1, wherein the acrylate oligomer is Triethylene glycol dimethylacrylate (TEGDMA) and is found in the range between about 23.0 to 27.0 w % of the formulation.

6. The method of claim 1, wherein the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof.

7. The method of claim 6, wherein the aluminum oxide trihydrate is in the range between about 52.0 to 55.0 w % of the formulation.

8. The method of claim 1, wherein the UV initiator is bisacylphosphine oxides (BAPO)s.

9. The method of claim 1, wherein the first amount of time is in the range between about 5 to 20 minutes.

10. The method of claim 1, wherein the second amount of time is in the range between about 10 to 14 hours.

11. The method of claim 1, further comprising:
adding a flame retardant additive to the photopolymer composite resin.

12. The method of claim 11, wherein the flame retardant additive includes at least sodium tetraborate and boric acid.

13. The method of claim 11, wherein the flame retardant additive is in the range between about 35 to 75 w % of the formulation.

14. A method of generating a formulation of a photopolymer composite material for use in a 3D printing system, the method comprising:
combining an acrylate oligomer, in the range between about 20.0-60.0 w % of the formulation, a ultraviolet (UV) initiator, in the range between about 0.001-0.5 w % of the formulation, and a reinforcing filler, in the range between about 5.0-60.0 w % of the formulation, in a blender;
generating a resin premix by blending the acrylate oligomer, the UV initiator, and the reinforcing filler through operation of the blender for a first amount of time;
combining the resin premix with an inorganic hydrate in the range between and 20.0-50.0 w % of the formulation in the blender;
generating a photopolymer composite resin by blending the inorganic hydrate and the resin premix through operation of the blender for a second amount of time;
loading the photopolymer composite resin from the blender into a second drum for storage;
mixing the photopolymer composite resin in the second drum with a mixer after a time interval in the range between about 3 hours and 7 days;
transferring a mixed photopolymer composite resin from the second drum into a mixing tank of the 3D printing system; and
combining the photopolymer composite resin with a dye in the range between about 0.01-0.05 w % of the formulation in the second drum through operation of the mixer.

15. The method of claim 14, further comprising:
adding a flame retardant additive to the photopolymer composite resin.

16. The method of claim 15, wherein the flame retardant additive includes at least sodium tetraborate and boric acid and is in the range between about 35 to 75 w % of the formulation.

17. A method of generating a formulation of a photopolymer composite material for use in a 3D printing system, the method comprising:
combining an acrylate oligomer, in the range between about 20.0-60.0 w % of the formulation, a ultraviolet (UV) initiator, in the range between about 0.001-0.5 w % of the formulation, and a reinforcing filler, in the range between about 5.0-60.0 w % of the formulation, in a blender;
generating a resin premix by blending the acrylate oligomer, the UV initiator, and the reinforcing filler through operation of the blender for a first amount of time, wherein the first amount of time is in the range between about 5 to 20 minutes;
combining the resin premix with an inorganic hydrate in the range between and 20.0-50.0 w % of the formulation in the blender; and
generating a photopolymer composite resin by blending the inorganic hydrate and the resin premix through operation of the blender for a second amount of time.

18. The method of claim 17, wherein the second amount of time is in the range between about 10 to 14 hours.

19. The method of claim 17, further comprising:
adding a flame retardant additive to the photopolymer composite resin.

20. The method of claim 19, wherein the flame retardant additive includes at least sodium tetraborate and boric acid and is in the range between about 35 to 75 w % of the formulation.

* * * * *